United States Patent [19]

Becker

[11] Patent Number: 4,730,468
[45] Date of Patent: Mar. 15, 1988

[54] LOCKING PIN FOR SEMI-TRUCK TRAILER LANDING GEAR

[76] Inventor: Milton Becker, 1246 Bankard, Nogales, Ariz. 85621

[21] Appl. No.: 904,566

[22] Filed: Sep. 8, 1986

[51] Int. Cl.⁴ ............................................. E05B 67/38
[52] U.S. Cl. ............................................ 70/34; 70/235
[58] Field of Search ............... 70/32, 33, 34, 57, 58, 70/23, 181, 235; 280/475, 507, 514, 515

[56] References Cited

U.S. PATENT DOCUMENTS

| | | |
|---|---|---|
| 3,139,291 | 6/1964 | Geresy . |
| 3,682,267 | 8/1972 | Kayser . |
| 3,982,413 | 9/1976 | Stone . |
| 4,358,941 | 11/1982 | Zimmer . |
| 4,377,178 | 3/1983 | Thompson . |

FOREIGN PATENT DOCUMENTS 1512299 12/1967 France ................................ 280/475

OTHER PUBLICATIONS

C. T. Johnson Enterprises, Dead Bolt Hitch Lock, Sep. 1, 1985.

Primary Examiner—Robert L. Wolfe
Attorney, Agent, or Firm—J. Michael McClanahan

[57] ABSTRACT

An anti-theft device for semi-truck trailer landing gear of the type of telescoping concentric inner and outer cylinders which inhibits the landing gear from being raised by preventing the retraction of the inner cylinder into the outer cylinder, the anti-theft device defining an elongated pin adapted to reside in an opening situated transversely through the inner cylinder and located proximate the outer cylinder, the elongated pin having a head at one end, an extending and retractable cog emerging from the shank of the elongated pin proximate the head, and a locking means interiorly to the hollow bore of the elongated pin with the lock located at the end of the elongated pin opposite the head and connected with the cog in order to extend and retract it. With the landing gear extended supporting one end of the semi-truck trailer, the anti-theft device with the cog retracted is inserted into an opening in the inner cylinder proximate the end of the outer cylinder and the lock operated to extend the cog, thereby preventing removal of the elongated pin and thus inhibiting the raising of the landing gear which then prevents easy removal of the semi-truck trailer by a semi-truck tractor.

9 Claims, 10 Drawing Figures

U.S. Patent  Mar. 15, 1988  4,730,468
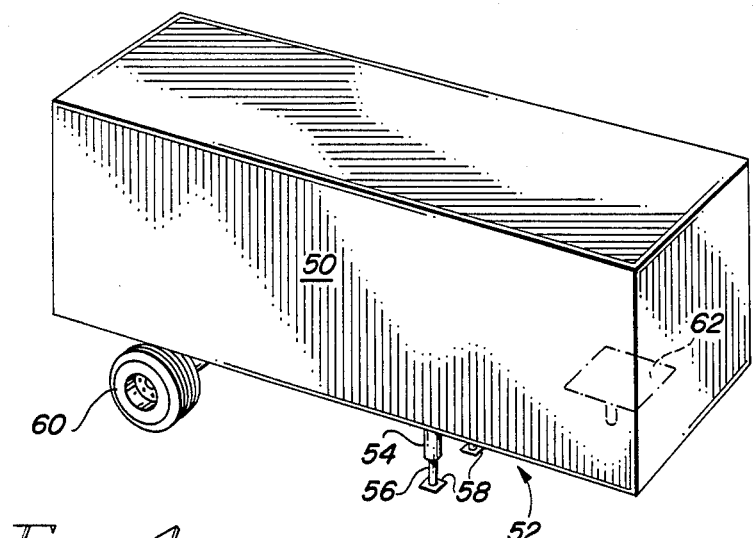
FIG. 1
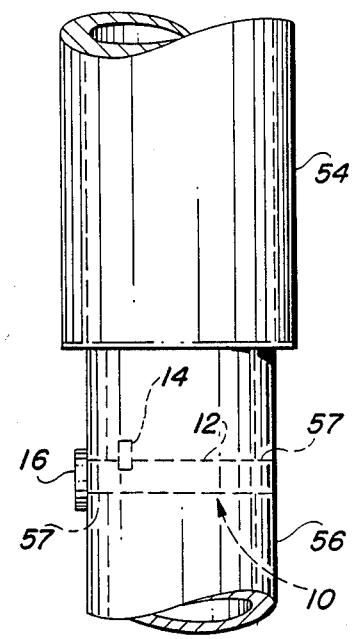
FIG. 2
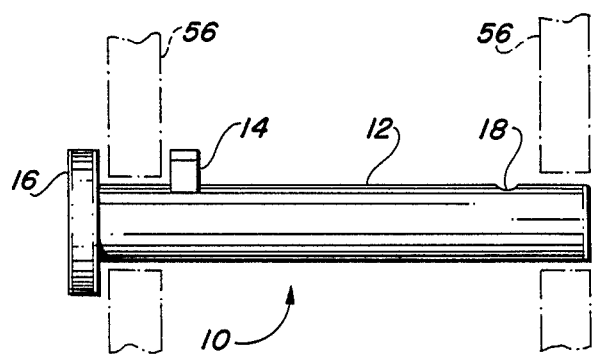
FIG. 3
FIG. 6
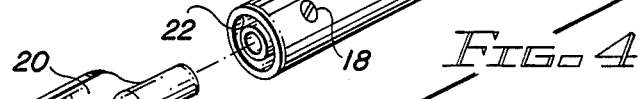
FIG. 4
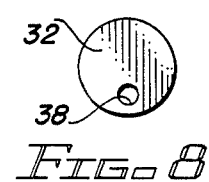
FIG. 7
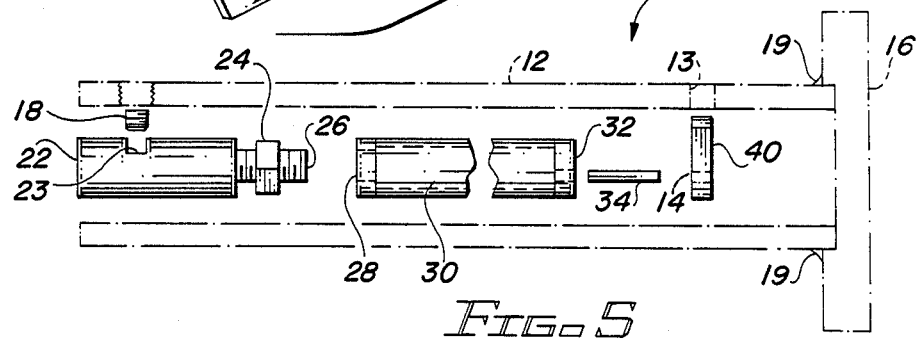
FIG. 5
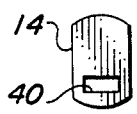
FIG. 8
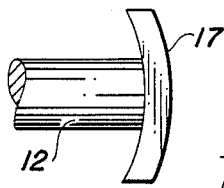
FIG. 9  FIG. 10

LOCKING PIN FOR SEMI-TRUCK TRAILER LANDING GEAR

BACKGROUND OF THE INVENTION

1. Field of the Invention.

The field of the invention is anti-theft device for semi-truck trailers.

2. Description of Related Art.

One of the problems with attempting to secure semi-truck trailers against theft is that the trailers are so amenable to being stolen. The convenience and relative ease of attaching and detatching a semi-truck tractor to the trailer also provides the convenience and ease by which to steal the trailer. Most, if not all, trailers and tractors utilize a so-called "fifth wheel" type lubricated flat swivel plate and catch assembly mounted on the tractor to engage a corresponding lubricated flat swivel plate and downward protruding "king pin" situated on the underside of the forward portion of the trailer. The trailer's king pin rides into a slot in the tractor swivel plate where it engages the catch assembly to be locked into place.

The trailer, absent the tractor, rests horizontally upon its rear wheels and upon the front landing gear.

Once a tractor has engaged the trailer swivel plate and king pin assembly, the trailer's landing gear is raised, and then the tractor may be driven off pulling the trailer behind it.

The landing gear conventionally comprises a pair of spaced apart concentric cylinders where the inner cylinder telescopes out of the outer cylinder to meet the ground. In most cases, the lower end of the inner cylinder is fitted with a metal flat plate "foot" for purposes of engaging the ground when the landing gear is in its extended down position and the trailer is separated from the tractor to stand by itself. To raise the landing gear, mechanical ratchet means are incorporated in the landing gear assembly by which the inner cylinders of the landing gear are telescoped into the outer cylinders and the inner cylinders with the foot are raised out of the way so that the trailer may be pulled without interruption. There may be separate mechanical ratchet means on each of the pair of concentric cylinders or a connecting rod may join the two ratchets together.

In most instances the landing gear is initially set while the trailer is still being supported by the tractor so that the landing gear will support the trailer after the tractor is driven out from under the front portion of the trailer.

If the trailer were to be pulled by a tractor with the landing gear still extended where the tractor's fifth wheel had raised the trailer's front portion slightly above the landing gear's resting position which would be the usual position where the landing gear is set in the instance just above, failure to retract the landing gear would result in the landing gear striking the least elevated spot in the road and interfering substantially with movement of the trailer from being moved over anything but an absolutely smooth road. If the height of the forward portion of the trailer in its resting position upon the landing gear were such that it were higher than the fifth wheel of the tractor, then it may be impossible for the tractor to secure the trailer without lowering the landing gear or railing the tractor. In any event, movement under either case would be impossible without substantially dragging of the landing gear.

Accordingly, it is obvious that if the unauthorized retraction of the landing gear can be prevented, a substantial anti-theft measure has been provided against unauthorized removal of a trailer. If the landing gear can not be retracted, then either engagement of the trailer by a tractor is rendered impossible without additional time consuming measures taken or movement of the trailer is rendered substantially more difficult.

Obviously then theft of the trailer is prevented against all but the most determined and best equipped thieves.

The Inventor is not knowledgeable of any other devices which renders a trailer landing gear selectively inoperable as an anti-theft measure, however, the Inventor is aware of measures which have been taken by other parties to similarily prevent theft of semi-truck trailers. For example, Stone et al, in U.S. Pat. No. 3,982,413 provides a lock which is adapted to surround the trailer "king pin" such as to effectively increase the shaft diameter of the king pin to a size that will not move into the slot of a semi-truck tractor "fifth wheel" swivel plate.

SUMMARY OF THE INVENTION

This invention relates to a means for providing anti-theft measures to a semi-truck trailer from a parked position absent the semi-truck tractor, the trailer being supported in a horizontal position by its rear wheels at the rear portion of the trailer and its landing gear at the forward portion of the trailer. The landing gear upon which the subject invention operates is a pair of spaced apart conventional telescoping hollow concentric cylinders, either round, square, or rectangular, operated by the inner cylinder telescoping into and out of the outer cylinder by power means, either a hydraulic cylinder or the more usual mechanical crank and ratchet assembly. The landing gear inner hollow cylinder has attached at its outside end, a foot adapted to engage the ground. With the landing gear in its extended position, it holds the trailer at a horizontal position and also holds the trailer for attachment to the semi-truck tractor. The tractor is backed under the forward portion of the trailer in order that the tractor "fifth wheel", a lubricated swivel plate and catch assembly, receives and secures a downward protruding king pin situated on a lubricated swivel plate located on the underside of the forward portion of the trailer. That accomplished, the landing gear inner cylinder is then retracted into the outer cylinder by conventional hydraulic means or crank and ratchet assembly situated on the landing gear assembly to prevent dragging when the trailer is moved.

The invention defines means by which the retraction of an inner cylinder into an outer cylinder of the landing gear assembly is prevented by presenting a novel stop mechanism which is easily placed through a transverse opening in the inner cylinder and, just as importantly, easily removed through means of a locking mechanism. The invention, a locking pin for semi-truck trailer landing gear, comprises firstly an elongated hollow shaft or shank which in the preferred embodiment is round, although it may be of most any cross-section, such as oval, square, rectangular, or the like, together with a head at one end, and a lock assembly at the other end. Situated in the outer surface of the shank of the locking pin proximate the head is a slotted opening through which a cog moves up and down transversely to the cylindrical axis of the locking pin shaft. The position of the cog, either in an extended position protruding from the outer cylindrical surface of the locking pin shaft or in a retracted position in which the cog lies at or below the exterior surface of the shaft, is controlled by the lock mechanism situated in the interior bore of the hollow shaft at the end of the pin opposite the head. In the preferred arrangement, the slotted opening through which the cog extends and retracts is proximate the head of the locking pin, separated by a distance from the head which is nominally slightly larger than the thickness of the walls of the inner cylinder. The locking pin shaft length is sized such that it approximates the diameter of the inner cylinder.

The locking mechanism or means, by which the cog is raised or lowered out of the slotted opening, has its key opening at the end of the shaft opposite the head such that the lock key which operates the lock mechanism is provided access into the lock mechanism. The lock mechanism is operably connected to the retractable and extendable cog such that by operation of the lock mechanism, the cog can be extended out of the locking pin shank or retracted within the locking pin shank.

With respect to the landing gear, a locking pin receiving hole is drilled through the landing gear assembly inner cylinder transversely to the inner cylinder longitudinal axis and through both walls of the cylinder. Since most landing gear assemblies utilize a pair of retractable cylinders, the hole may be drilled in both of the inner cylinders to provide two separate lockable configurations. The hole is sized only slightly larger than the locking pin shaft diameter in order to receive the locking pin and without the necessity of a lubricant. However, the hole in the inner cylinder should be small enough that the locking pin, with the cog extended, may not be removed from the hole. The hole is further located in the inner cylinder at a point proximate the area where the inner cylinder just exits the outer cylinder when the inner cylinder is in an extended position such that the landing gear would be holding the trailer level.

Thus, with the inventive locking pin in place, the landing gear inner cylinder may not be retracted into the outer cylinder beyond the point where the head of the locking pin engages the exterior circular end of the outer cylinder. This being so, the trailer is now rendered substantially theft-proof.

It is an object of the subject invention to provide an anti-theft mechanism for semi-truck trailers.

It is another object of the subject invention to provide an anti-theft device for semi-truck trailers by inhibiting the retraction of the trailer landing gear.

It is still a further object of the subject invention to provide a locked anti-theft device which is easily placed on the trailer landing gear assembly, and just as easily removed by a party who possesses the proper lock key.

Other objects of the invention will in part be obvious and will in part appear hereinafter. The invention accordingly comprises the apparatus comprising the construction, combination of elements, and arrangement of parts which are exemplified in the following detailed disclosure, and the scope of the Application which will be indicated.

BRIEF DESCRIPTION OF THE DRAWINGS

For further understanding of the nature and objects of the prevent invention, reference should be had to the following detailed description taken in connection with the accompanying drawings wherein:

FIG. 1 is a perspective view of a semi-truck trailer with real wheels and landing gear assembly.

FIG. 2 is a side view of a portion of the landing gear with the invention in place;

FIG. 3 is an expanded side view of the invention in place in the landing gear assembly;

FIG. 4 is a perspective view of the subject invention;

FIG. 5 is a side view of the subject invention broken down into its component parts;

FIGS. 6 through 9 are front views of component parts of the invention;

FIG. 10 is a partial top view of the invention in an alternate embodiment.

In various views, like index numbers refer to like elements.

DETAILED DESCRIPTION OF THE PREFERRED EMBODIMENT

Referring now to FIG. 1, a perspective view of the semi-truck trailer to which the landing gear is attached is shown. Firstly, semi-truck trailer 50 is shown with rear wheels 60 located near the rear portion of the trailer and the trailer lubricated swivel plate and king pin assembly 62 located upon the underside of the trailer in the front portion. Near the front portion of the trailer is the landing gear assembly 52 which comprises a pair of substantially identical spaced apart concentric outer cylinders 54 and inner cylinders 56. The relationship between the concentric inner and the outer cylinders is such that cylinder 56 is almost fully telescoped into the outer cylinder 54 when landing gear is raised and the semi-truck trailer 50 is connected to a truck tractor via the trailer swivel plate and king pin assembly 62. Inner cylinder 56 is brough into outer cylinder 54 with the result that the foot 58 attached to the end of inner cylinder 56 is raised off the ground and raised to a high enough level that foot 58 will not strike the ground as the trailer is pulled around by a tractor. As is obvious, the purpose of the landing gear assembly 52 is to hold up the front end of the semi-truck trailer 50 to a relatively horizontal level when the trailer 50 is detatched from a tractor. Thus the landing gear assembly is utilized when the trailer is used for storage or when it is being loaded or unloaded absent a semi-truck tractor.

In usual construction, the inner cylinder 56 is retracted into the outer cylinder 54 through means of a mechanical ratchet mechanism interiorly to the outer cylinder 54, or with a hydraulic cylinder interiorly to outer cylinder 54. A ratchet mechanism or hydraulic cylinder must be in each of the pair of concentric cylinders although they may be interconnected so as to be both operable from one side of the trailer. The inner and outer cylinders may be round, square, or rectangular in shape.

FIG. 2 is an enlarged partial side view of the landing gear assembly showing the inventive locking pin 10 in place situated in an opening transversely through the hollow inner cylinder 56 in such a way that retraction of inner cylinder 56 into outer cylinder 54 is prevented because head 16 of locking pin 10 would be rammed up against the circular rim of outer cylinder 54 should attempt to retract cylinder 56 be tried. Thus, head 16 would stop inner cylinder 56 from retracting into outer cylinder 54 further tha its location.

The relationship of the inner and outer cylinders 56 and 54 respectively is such that in most semi-truck trailers, there is a small clearance between the outer surface of inner cylinder 56 and the inner surface of outer cylinder 54 such that grease or other lubricants may be utilized (although not necessary) to ease the work of retracting inner cylinder 56. Shown also in FIG. 2 is the inner surface of the outer cylinder 54 and the inner surface of the inner cylinder 56.

A hole is drilled or formed through both side walls of inner cylinder 56. The hole is sized just slightly larger than the diameter of elongated pin shank 12 of locking pin 10, but large enough that lubricant is not required to insert locking pin 10. The hole also must not be so large that cog 14, in its extended position, would pass through.

Locking pin 10 spans the complete diameter between the outer surface of inner cylinder 56, having head 16 on one side which protrudes beyond the outer surface of inner cylinder 56, and the end of shaft or shank 12 of locking pin 10 flush with the opposite outer surface of inner cylinder 56. Shown emerging transversely from the outer surface through an opening in shank 12 of locking pin 10 is cog 14. Cog 14, which is extendable from a position immediately below the outer surface of shank 12 to a position above the surface of shank 12, serves to prevent removal of locking pin 10 from its position across the diameter of inner cylinder 56 by providing a stop which engages the inner wall of inner cylinder 56 if attempts to remove locking pin 10 is made while cog 14 is in its extended position.

Thus it can be seen with locking pin 10 in place crossing from one side of inner cylinder 56 to the other, inner cylinder 56 may not be retracted into outer cylinder 54 any further than where head 16 of locking pin 10 hits the rim of outer cylinder 54. Locking pin 10 itself can not be removed from its position across inner cylinder 56 because cog 14, when in its extended position, also engages the inner side of the wall of inner cylinder 56.

In FIG. 3, a side view of locking pin 10 is shown wherein the walls of the inner cylinder 56, together with the hole drilled to receive locking pin 10, afe shown in dotted form. As already discussed, locking pin 10 shank 12 traverses the complete diameter of inner cylinder 56 to be terminated at one end by head 16, and secured in inner cylinder 56 by cog 14 when cog 14 is in its raised extended position. Shown on the opposite end of shank 12 of locking pin 10 is set screw 18 which, as explained later, is part of the means by which the lock is held within the hollow interior of shank 12.

Referring now to FIG. 4, a perspective view of locking pin 10 is shown with lock 22 situated in the end of the cylinder which makes up shank 12. Lock 22 is held in place in the end of shank 12 by means of set screw 18 which screws through the cylinder wall of shank 12 and into recess 23 (not shown) of lock 22. Immediately across from lock 22 is key 20 which operates lock 22. Near the far end from the lock on shank 12 is cog 14, shown here in its extended position protruding from the surface of shank 12. At the opposite end of shank 12 from lock 22 is circular head 16 which is, in the preferred embodiment, welded to the end of shank 12. As will be seen in FIG. 5, a circular recess is formed in the flat center portion of head 16 to receive and center the shank 12, and then the peripheral surface of shank 12 is welded to the flat surface of head 16.

Referring now to FIG. 5, an exploded side view of the locking means or mechanism assembly which is internal to the interior bore of cylindrical shank 12 is shown and particularly the connecting means between lock 22 and cog 14. For purposes of clarity, the interior diameter of shank 12 has been expanded beyond the exterior surfaces of the lock mechanism assembly interiorly to shank 12, it being realized that when the locking pin 10 is assembled all parts are close fitting and a lubricant is placed interiorly to shank 12 in order that the parts may be easily inserted to construct locking pin 10. As will be seen later, certain parts within the interior of shank 12 rotate and are in close proximity with the interior circular surface of shank 12.

Commencing at the left handed side of FIG. 5, lock 22 is shown in position at the outside end of shank 12 where the face of lock 22 is flush with the circular rim of the cylinder forming shank 12. Set screw 18, which screws into threads formed in the cylindrical wall of shank 12, is screwed down until it engages recess 23 formed in the cylindrical outside surface of lock 22. By this manner, with set screw residing both in shank 12 and in lock 22, lock 22 is held in position against any movement, either laterally or rotational. Continuing to the right, lock 22 terminates with threaded bolt 26 upon which nut 24 resides. Threaded bolt 26 is characterized in its end portion as having a cross-sectional shape much like a three-quarter moon, i.e., a portion of the circular shape has been removed. The three-quarter moon shape formed on the end of threaded bolt 26 slidably ergages first end washer 28 which has formed in its center a keyed opening adapted to receive the end of threaded bolt 26. The keyed opening in first end washer 28 is such that once it is engaged by threaded bolt 26, threaded bolt 26 may be rotated and causes the first end washer 28 to rotate with it. First end washer 28 is welded to the circular end of cylindrical tube 30 which is permitted to rotate within the interior shank 12. It is suggested that a lubricant is liberally applied to the outside of circular tube 30 during assembly to premit easy rotation. Cylindrical tube 30 continues to the right where it is terminated with a second end washer 32 which is also welded to the other circular end of cylindrical tube 30. Formed in the flat disk surface of second end washer 32 is an opening, located off center, the opening adapted to receive and secure pin 34. Pin 34 is welded in place in the opening in second end washer 32. Pin 34 continues to the right and engages slot 40 (shown dotted) in cog 14. Pin 34 is loose in slot 40 and thus permitted movement within that slot. Continuing with FIG. 5, slotted opening 13 is shown in the cylindrical wall of shank 12 which allows cog 14 to move up and down so that the cog 14 can extend from a position which is approximately level or just below level with the outside cylindrical surface of shank 12 to a position where cog 14 extends well above the outside cylindrical surface of shank 12 such that the cog engages the inside inner wall of inner cylinder 56 if pushed up against it. Then, at the far right hand side of FIG. 5, head 16 is shown attached to the circular end of shank 12, shank 12 fitting into a circular recess formed centrally in the flat circular side of head 16. Welding bead 19 is shown attaching shank 12 to head 16.

Referring now to FIGS. 6 through 9, front views of the different parts that make up part of the lock mechanism assembly and were described in FIG. 5, are detailed. As seen from FIG. 6, an end view of threaded bolt 26 having a three-quarter moon cross-sectional shape earlier referred to, is shown with lock nut 24 residing on threaded bolt 26. In the front view of first end washer 28 (FIG. 7) is formed the three-quarter moon keyed opening 36 adapted to slidably receive the end of threaded bolt 26 and thus first end washer 28 is in position so as to rotate when threaded bolt 26 rotates.

As mentioned above, at the opposite end of cylindrical tube 30 is second end washer 32 (FIG. 8) which, like first end washer 28, is a round disk in shape and has an off center circular opening 38 adapted to receive for permanent securing, pin 34. Pin 34, which was shown in FIG. 5, has one end residing in opening 38 and is welded there with the majority of the length of the elongated pin 34 protruding beyond the circular face of second end washer 32. Pin 34 is adapted to engage slot 40 of cog 14 shown in FIG. 9 in a loose arrangement. The keyed opening 36 in first end washer 28, the pin opening 38 in second end washer 32, and the slot 40 in cog 14 were all shown in dotted relief in their respective elements in FIG. 5.

The inventive locking pin 10 is assembled by firstly placing cog 14 into the slotted opening 13 of elongated pin shank 12 and allowing it to drop until it bottoms. At this point, the top-most part of cog 14 is at most even with but no above the outside circular surface of shank 12 and it should not fall below the inner surface of shank 12. It is suggested that the top portion of cog 14 assume a generally rounded shape with the same radius as the radius of shank 12. In this manner, a relatively smooth surface is presented at the top of slotted opening 13 when cog 14 is in its lowest position. Next, the lock assembly comprising lock 22 and cylindrical tube 30 with its welded first and second end washers (with pin 34 welded in place to second end washer) is inserted into the hollow interior of shank 12 and rotated until it is determined that elongated pin 34 has entered slot 40 of cog 14. At this point, it is obvious that cylindrical tube 30 must have a length which is determined to fulfill the correct length necessary to achieve all parts fitting into the shank. There is some leeway for length inasmuch as the exact position of cog 14 on pin 34 is not of particular consequence except that the closer cog 14 is to second end washer 32, the less side pressure is placed upon elongated pin 34 when second end washer 32 is rotated to lift cog 14 up to its extended position above the exterior surface of shank 12, or to retract cog 14. Similarly, threaded bolt 26 does permit lateral movement within the keyed opening 36 of first end washer 28. Placement of nut 24 upon threaded bolt 26 does also serve to increase or decrease slack in the combination of parts. Once all the components have been located interiorly to the shank 12, lock 22 is set in place by aligning the recess 23 under the set screw 18, and then screwing down set screw 18 to hold lock 22 and the lock assembly in place.

Lock 22 is of the type that utilizes a cylindrical key 20 and is manufactured by Chicago Lock Company and is termed an "Interior Lock, Ace II" model. The particular lock utilized in the invention was type No. 4140 and is a smooth bore cylinder having a five/eighth inch diameter. The lock mechanism assembly operates such that with the cylindrical key 20 inserted into the receiving end opening, turning key 20 rotates threaded bolt 16. This in turn rotates cylindrical tube 30 with its first and second end washers, causing pin 34 to move up and down (when viewed from the side as in FIG. 5), thus imparting lifting motion to cog 14, in and out of slotted opening 13 of shank 12. Actually pin 34 moves in a circular path, but with the elongated slot in cog 14 and the freedom of motion allows cog 14, it imparts an up and down motion to cog 14.

In operation, once a semi-truck trailer has been parked by a tractor, the landing gear is operated by extending the inner cylinder to place the foot of the landing gear assembly on or near the ground, and then the tractor swivel plate and catch assembly is disengaged and the tractor is driven off. The trailer then comes to rest upon the landing gear.

To utilize the anti-theft features of the invention, the inventive locking pin is first examined for assurance that the cog is in the retracted position below the pin shank exterior surface. The locking pin is then inserted into the hole in the inner cylinder, with the cog retracted, until the head of the locking pin prevents further insertion. At this point, the end of the locking pin opposite the head, which has been pushed through the hole in the inner cylinder opposite the entrance hole, is approximately flush with the outside exterior surface of the inner cylinder. With the locking pin in place, the lock key is inserted into the lock mechanism key opening at the end of the locking pin shank and the lock operated such as to extend the cog outward from the locking pin shank. The key is then removed. At this point, the locking pin is held in position from removal from the inner cylinder as the pin can not be pushed all the way through the hole in the inner cylinder because the head is stopping it, and the pin can not be pushed out of the hole in the inner cylinder because the cog, being located next to the inner cylinder inner wall, prevents other than slight lateral movement of the locking pin.

If, as earlier described, the locking pin is located in a position such that it is proximate the outer cylinder circular end, movement of the inner cylinder into the outer cylinder is prevented other than that slight movement between the original position of the locking pin head and the actual engagement of the head by the outer cylinder end wall when the inner cylinder is moved up into the outer cylinder. As a consequence, the landing gear assembly on the semi-truck trailer may not be retracted, and thus the trailer is rendered theft proof for all practical purposes.

For removal of the locking pin from the inner cylinder, a party need only to possess the proper lock key to insert the key in the lock opening in the end of the locking pin shank, operate the key and lock which causes the cog interiorly to the shank to retract into the shank, and then remove the key and slidably remove the locking pin from the inner cylinder hole. At that point, the inner cylinder may then be fully retracted into the outer cylinder and the trailer pulled away.

It is obvious that for any number of situations, one hole drilled in the inner cylinder of the landing gear assembly may not be in the most advantageous position relative to the bottom of the outer cylinder for use of the invention. For example, the hole may be situated well below the outer cylinder such that enough of the inner cylinder could be retracted to render the invention not as effective as it could be. Therefore, it is suggested that a plurality of holes be drilled through the inner cylinder so that a choice of holes to receive the locking pin is offered. In that manner, a hole in the inner cylinder close to the bottom of the outer cylinder can be utilized so that there will be little or no retraction of the inner cylinder into the outer before the locking pin inhibits further movement.

It is noted that while in the preferred embodiment, the location of slot 13 in shank 12 is at a point only slightly more distant from the head 16 than the thickness of the cylindrical wall of inner cylinder 56, yet slot 13 could be anywhere along shank 12 except within the inner cylinder wall thickness of each end of shank 12 and the invention would still function.

Lastly, in FIG. 10, an alternate embodiment is shown where the head of locking pin 10 is not a flat disk or washer as shown in earlier drawings and designated as Numeral 16, but has a curved head which has been curved to conform to an outer circular cylindrical surface of the inner cylinder 56. The view shown in FIG. 10 is a top view wherein the concave configuration is only in the vertical direction. The whole head 17 is not shaped such as a rounded dome would be.

While a preferred embodiment and one alternate embodiment has been shown and described, it will be understood that there is no intent to limit the invention by such disclosure, but rather it is intended to cover all modifications and alternate constructions falling within the spirit and the scope of the invention as defined in the appended claims.

I claim:

1. An anti-theft device for semi-truck trailers preventing the telescoping concentric inner and outer cylinder type landing gear from being raised to inhibit easy moving of the semi-truck trailer comprising:

an elongated pin having a shank with two ends, said shank defining a cylinder having an outer surface with an interior bore and an opening communicating said outer surface to said interior bore, said elongated pin of a length equal to the diameter of said inner cylinder adapted to be emplaced in a transverse opening through the inner cylinder of the landing gear to a position where the end is flush with said inner cylinder;

a head connecting to one end of said elongated pin, said head closing said elongated pin interior bore at the other end; and locking means situated within said elongated pin interior bore adapted to lock said elongated pin in place in the opening in the landing gear inner cylinder, said locking means including a cog extendable above and retractable below said outer surface of said locking pin shank through said outer surface opening, and said locking means further including a lock operably connected to said cog, said lock situated at the end of said elongated pin opposite the end connected to said head, said cog adapted to prevent removal of said elongated pin from said transverse opening through the inner cylinder of the landing gear whereby retraction of the inner cylinder into the outer cylinder is inhibited preventing the landing gear from being raised and thereby preventing easy theft of the semi-truck trailer by a semi-truck tractor.

2. The anti-theft device as defined in claim 1 wherein said lock selectively extends and retracts said cog in said opening in said elongated pin shank surface.

3. The anti-theft device as defined in claim 2 wherein said head comprises a round flat disk having a central circular portion removed, said central circular portion adapted to receive one end of said elongated pin.

4. The anti-theft device as defined in claim 2 wherein said head defines a concave shaped head adapted to partially surround a round inner cylinder.

5. The anti-theft device as defined in claim 3 wherein said locking means lock defines a key receiving lock and connecting means interposed said lock and said cog, said connecting means further comprising a first circular disk adapted to be engaged by said lock, a cylinder welded to said first circular disk, a second circular disk welded to said cylinder, said second circular disk including an off-center opening therethrough, and a pin situated and welded in said second disk off-center opening, said pin adapted to engage a slot in said cog whereby said lock may be turned by said key and the cog thereby extended and retracted.

6. The anti-theft device as defined in claim 2, wherein said opening in said elongated pin shank surface is situated proximate said head a distance greater than the thickness of the landing gear inner cylinder wall away from said head.

7. An anti-theft device for semi-truck trailers comprising in combination a locking pin and semi-truck trailer landing gear, the combination comprising:

a semi-truck trailer landing gear having at least one telescoping concentric inner cylinder and outer cylinder, said inner cylinder adapted to telesocpe in and out of said landing gear; and a locking pin adapted to be operably attached to said inner cylinder to prevent said inner cylinder from telescoping into said outer cylinder, said locking pin defining an elongated pin having a length equal to the diameter of said inner cylinder and shank with two ends, said shank defining a cylinder having an outer surface with an interior bore and an opening communicating said outer surface to said interior bore, a head connecting to one end of said elongated pin, said head closing said elongated pin interior bore at one end; and locking means situated within said elongated pin interior bore, said locking means including a cog extendable above and retractable below said outer surface of said locking pin shank through said outer surface opening, said locking means further including a lock operably connected to said cog, said lock situated at the end of said elongated pin opposite the end connected to said head, said cog adapted to prevent removal of said elongated pin operably attached to said inner cylinder and thereby inhibiting the landing gear from being raised and allowing the semi-truck trailer to be easily moved.

8. The anti-theft device as defined in claim 7 wherein said semi-truck trailer landing gear inner cylinder defines at least one opening transversely through said inner cylinder, said opening adapted to receive said locking pin.

9. The anti-theft device as defined in claim 8 wherein said locking pin lock defines a key receiving lock whereby when said lock receives said key, said lock may be operated to retract or extend said cog from said shank opening and thereby lock said locking pin in said inner cylinder.

* * * * *